United States Patent
Adamiecki et al.

(10) Patent No.: US 9,225,425 B2
(45) Date of Patent: Dec. 29, 2015

(54) SYSTEM AND METHOD FOR DUAL SPEED PASSIVE OPTICAL NETWORKS

(75) Inventors: Andrew Larry Adamiecki, Morganville, NJ (US); Ilija Hadzic, Millington, NJ (US); Doutje T. Van Veen, New Providence, NJ (US); Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1554 days.

(21) Appl. No.: 12/074,692

(22) Filed: Mar. 5, 2008

(65) Prior Publication Data

US 2009/0226182 A1    Sep. 10, 2009

(51) Int. Cl.
| | |
|---|---|
| H04B 10/272 | (2013.01) |
| H04L 25/06 | (2006.01) |
| H04Q 11/00 | (2006.01) |
| H04J 3/22 | (2006.01) |

(52) U.S. Cl.
CPC ............ *H04B 10/272* (2013.01); *H04L 25/062* (2013.01); *H04Q 11/0067* (2013.01); *H04J 3/22* (2013.01)

(58) Field of Classification Search
USPC .......................................................... 398/63
See application file for complete search history.

(56) References Cited

U.S. PATENT DOCUMENTS

| | | | | |
|---|---|---|---|---|
| 5,917,979 | A * | 6/1999 | Prucnal | 385/122 |
| 7,058,315 | B2 * | 6/2006 | Brewer et al. | 398/202 |
| 7,653,312 | B2 * | 1/2010 | Mori | 398/100 |
| 2004/0251403 | A1 * | 12/2004 | Park et al. | 250/221 |
| 2007/0291777 | A1 | 12/2007 | Jamieson et al. | |
| 2008/0002977 | A1 * | 1/2008 | Mori | 398/71 |
| 2008/0226294 | A1 * | 9/2008 | Sakai et al. | 398/63 |
| 2010/0290779 | A1 * | 11/2010 | Zaacks | 398/25 |

FOREIGN PATENT DOCUMENTS

JP    2007243796 A    9/2007

OTHER PUBLICATIONS

ITU-T G.984.2, "Gigabit-Capable Passive Optical Networks (GPON): Physical Media Dependent (PMD) Layer Specification", Mar. 2003.*

* cited by examiner

*Primary Examiner* — Shi K Li
(74) *Attorney, Agent, or Firm* — RGIP LLC (57) ABSTRACT

In a dual speed passive optical network, an optical line termination (OLT) transmits a communication signal having a 10-Gb/s partition and a 2.5-Gb/s partition. The 10-Gb/s partition includes a 10 G data signal and a 2.5 G clock signal so that the PLL of a 2.5 G (legacy) optical network termination (ONT) can remain locked while a 10 G ONT is receiving data. The 2.5 G clock signal includes 1-bit spike signals of greater amplitude than the 10 G data signal.

18 Claims, 8 Drawing Sheets

SYSTEM AND METHOD FOR DUAL SPEED PASSIVE OPTICAL NETWORKS

FIELD OF THE INVENTION

This invention relates to passive optical networks and in particular to 10 Gigabit-per-second passive optical networks based on the ITU-T G.984 standard which have dual speed capabilities.

BACKGROUND OF THE INVENTION

Current Gigabit/s Passive Optical Networks (GPONs) have a standard operating speed of 2.5 Gb/s. However, standards for GPONs having an operating speed of 10 Gb/s are under development which will require an upgrade of existing networks. A straightforward approach to upgrade the network is to upgrade the Optical Line Termination (OLT) from 2.5 Gb/s to 10 Gb/s and then upgrade the Optical Network Termination (ONT), sometimes referred to as an Optical Network Unit (ONU), of every subscriber. However, such an approach is likely to be prohibitively expensive. Further, the network will experience downtime until all of the subscribers are upgraded, which may be a couple of days to a couple of weeks time period.

One alternative upgrade scenario would be to upgrade the OLT to 10 Gb/s first, but provide backwards compatibility such that legacy ONTs can interoperate with the new OLT. Thus the new OLT must also be configured to run at 2.5 Gb/s (legacy speed). Such a system is considered to be 10-Gb/s-ready, but is still not running at 10 Gb/s. The upgrades of the ONTs will occur only when the subscriber requests them, with the understanding that some subscribers may never request to upgrade and thus will remain with equipment configured for 2.5 Gb/s only.

Thus at some stage during the upgrade, the PON system would consist of a dual-speed OLT (i.e., an OLT capable of transmitting at either 10 Gb/s or 2.5 Gb/s) and a mixture of advanced and legacy subscribers (i.e. subscribers whose ONT runs at 10 Gb/s and subscribers whose ONT runs at 2.5 Gb/s). In such a network, the dual speed OLT may be transmitting to either legacy or advanced ONT switching the speed from one to the other.

To provide dual speed transmission, a frame format is used having consecutive 10 G and 2.5 G partitions. A problem with dual speed transmission is that during a 10 G partition for example, legacy ONTs are not receiving data but must maintain their Phase-Locked Loops (PLL)s in a locked state, i.e. they must keep the recovered clock stable and unchanged, so that they can receive the data when the 2.5 G partition starts. During the 2.5 G partition, legacy ONTs are receiving data, while advanced ONTs are maintaining the recovered clock locked. If both partitions use the most commonly used non-return to Zero on-off keying (NRZ-OOK) modulation format, maintaining the clock locked by the legacy receivers during the 10 G partition would not be possible due to inherent phase ambiguity that exists in every signal that is an integer times faster than the nominal signal.

What is required is a system, method and computer readable medium capable of providing dual speed transmission in a passive optical network.

SUMMARY OF THE INVENTION

In one aspect of the disclosure, there is provided a passive optical network comprising at least one optical line termination; at least one first optical network termination operating at a first speed; at least one second optical network termination operating at a second speed slower than said first speed; wherein the at least one optical line termination transmits a data signal comprising at least one first speed partition and at least one second speed partition; wherein the at least one first speed partition comprises a signal processable by the at least one second optical network termination to extract a second speed clock signal.

In one aspect of the disclosure, there is provided a method of communicating data on a dual speed passive optical network comprising generating a transmission signal comprising at least one first partition and at least one second partition; and transmitting said transmission signal; wherein the at least one first partition comprises a first data signal at a first speed and a clock signal at a second speed; wherein the at least one second partition comprises a second data signal at said second speed.

In one aspect of the disclosure, there is provided an optical line termination comprising a signal generator that generates a signal comprising a first data signal at a first speed and a timing signal at a second speed.

In one aspect of the disclosure, there is provided an optical network termination comprising a signal receiver; an extraction circuit that processes a received signal received by said signal receiver and separates a first speed data signal from a second speed timing signal.

In one aspect of the disclosure, there is provided a method of operating an optical network termination comprising receiving a signal comprising a data signal having a first amplitude and a first signal rate and a clock signal having a second amplitude greater than said first amplitude and a second signal rate; and separating said data signal from said clock signal.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
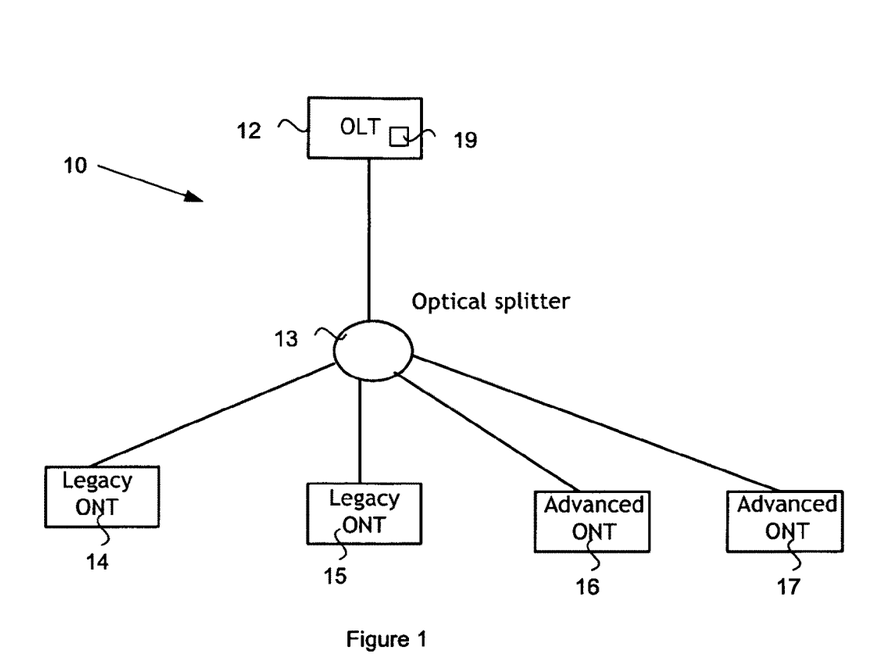
FIG. 1 schematically shows a passive optical network.

A GPON 10 is shown schematically in FIG. 1 that includes an advanced OLT 12 with a signal generator 19 capable of generating dual speed transmissions, such as a base speed of 2.5 Gb/s and a higher speed such as 10 Gb/s. Transmissions are received at an optical splitter 13 and then conveyed to individual ONTs 14, 15, 16, 17. ONTs 14, 15, 16, 17 may be legacy ONTs configured to receive data at the base speed or advanced ONTs configured to receive data at the higher speed. For the purpose of the present example, ONTs 14, 15 are considered to be legacy ONTs while ONTs 16, 17 are considered to be advanced ONTs. In the foregoing description, the base speed will be described as being at 2.5 Gb/s (2.5 G) while the higher speed will be described as being at 10 Gb/s (10 G), though the person skilled in the art will readily understand that other speeds may be provided for in a dual speed network.

Figure 2:
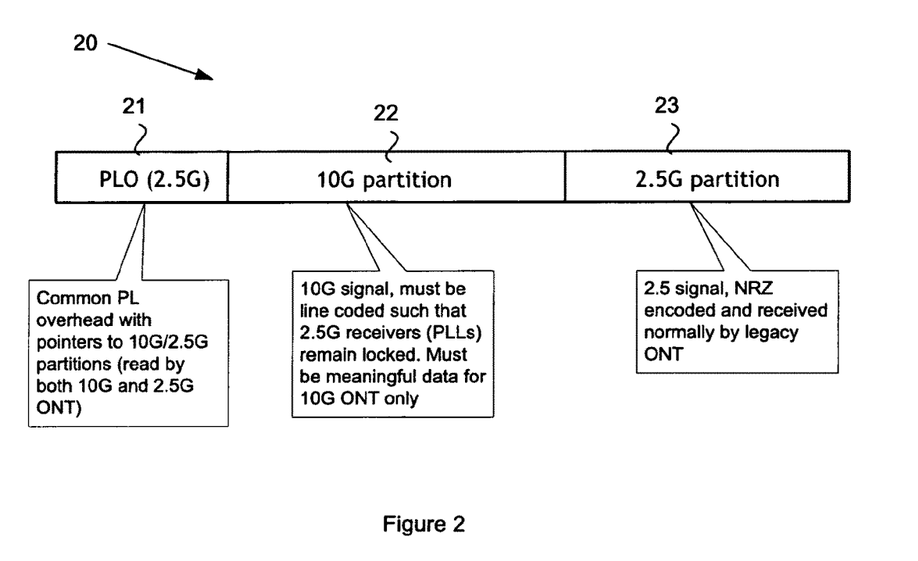
FIG. 2 schematically shows a dual speed frame format.

In FIG. 2, there is shown a frame format 20 that may be transmitted by the OLT 12 on the dual speed optical network 10. First the OLT 12 transmits the physical layer overhead 21 at 2.5 G which is read by all ONTs 14, 15, 16, 17. This overhead is coded using the same line code that is used by the legacy ONTs and contains the pointers to 10 G and 2.5 G partitions.

After the overhead 21, a 10 G partition 22 is transmitted at 10 Gb/s speed. All advanced ONTs 16, 17 receive this partition and read the data depending on the address. During this period, legacy ONTs 14, 15 are not receiving data, but must maintain their PLLs locked.

The 10 G partition is followed by a 2.5 G partition 23 which is received by the legacy ONTs 14, 15 while the advanced ONTs must maintain their PLLs locked. Maintaining the lock of an advanced ONT 16, 17 during the 2.5 G partition 22 is relatively simple and requires only a PLL whose run-length is 4×N, where N is the run length of the 2.5 G signal However, the line code used by the 10 G partition is more complex. The line code used by 10 G partition cannot be a traditional NRZ code, but a code that is 2.5 G-friendly, while still transmitting data at 10 Gb/s. In an embodiment of the disclosure, the line code is designed such that to the legacy ONTs 14, 15 it looks like 2.5-Gb/s data, which may be meaningless data, but still data from which the clock can be reliably recovered, and to the advanced ONTs 16, 17 it looks like meaningful 10-Gb/s data signal.

The network 10, and more particularly the line code used by the OLT, can be designed to take advantage of the known properties of the legacy ONTs. In particular, the legacy ONTs include a broadband optical receiver with possible wavelength block at 1550 nm (wavelength reserved for RF video overlay), a transimpedance amplifier (TIA), a limiting amplifier followed by a binary detector and a PLL designed to recover a nominal clock of 2.5 Ghz. The bandwidth of the two amplifiers combined is slightly lower than 2.5 Ghz and typically all of the components above 2.5 Ghz are completely suppressed.

Figure 3:
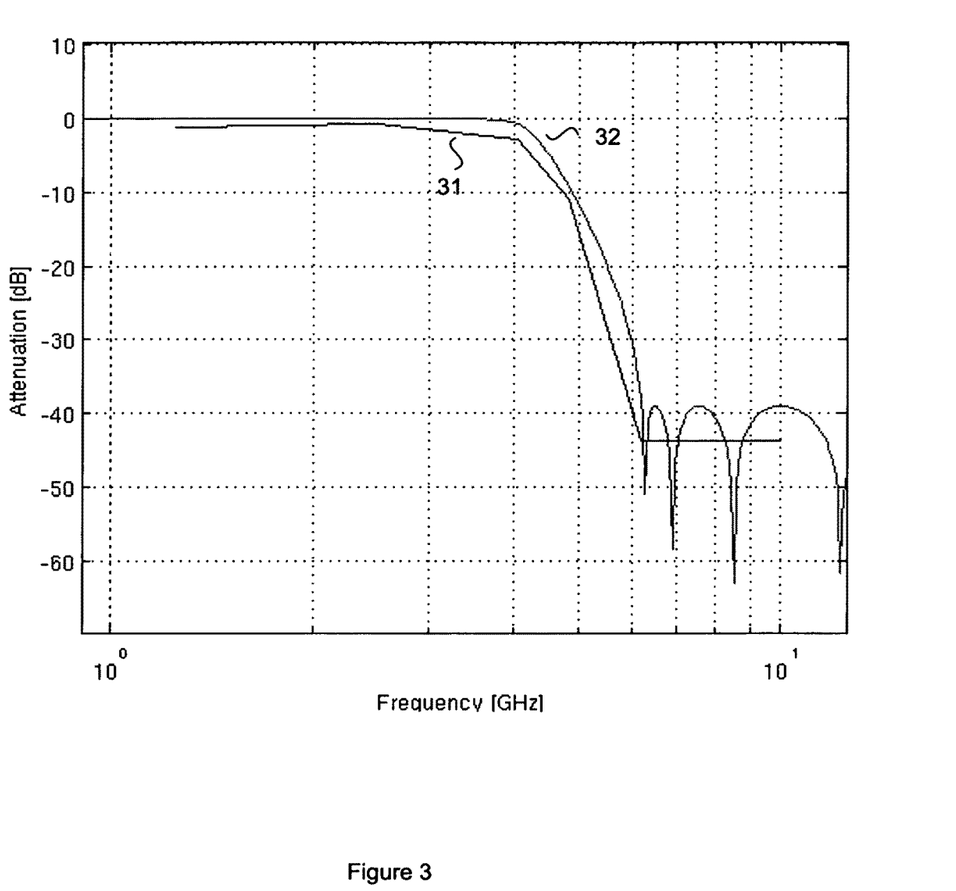
FIG. 3 schematically shows a frequency response of a legacy ONT.

FIG. 3 shows the typical frequency response 30 of the legacy receiver. Curve 31 has been constructed by measuring the response at several points and connecting the measured data points with straight lines, while the curve 32 has been constructed by interpolating a Type-II Chebyshev filter using the measured points (i.e. mathematical model convenient for simulations).

Figure 4:
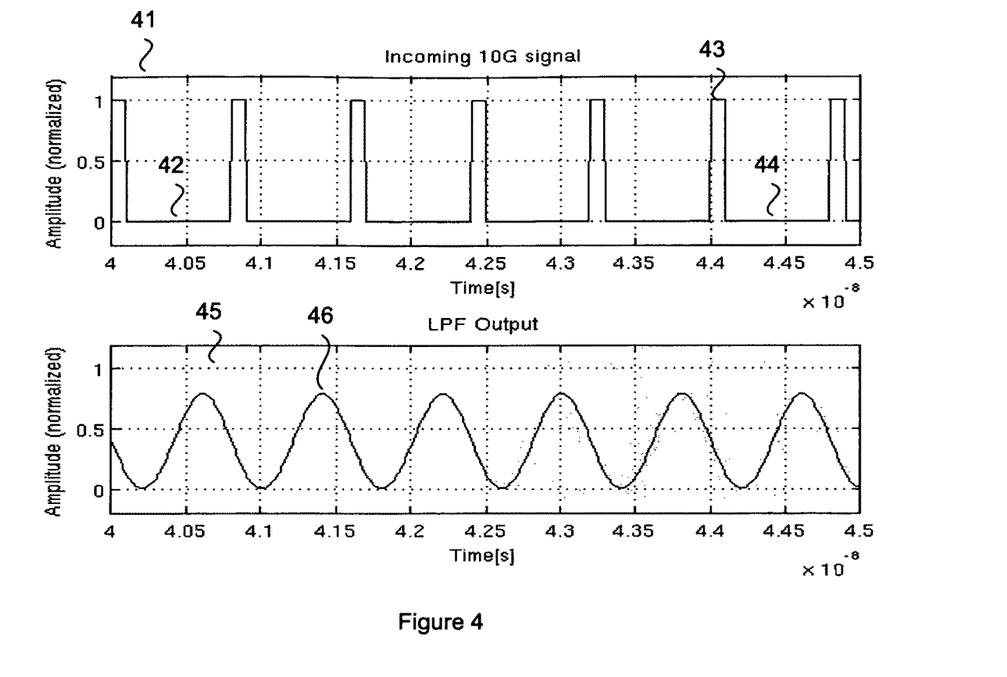
FIG. 4 shows a 2.5 G spike signal.

FIG. 4 shows the principles used in constructing a 2.5 G-friendly signal in accordance with one embodiment of the disclosure. Graph 41 is a 10-Gb/s signal 42 with pilot spikes 43 repeated every 8 bits and no signal 44 in between. Thus, the signal 42 can be viewed as a train of 10-Gb/s pulses placed at a 1.25-Ghz grid. When such a signal is passed through the simulating filter described with reference to FIG. 3, the resulting signal is a 1.25-GHz sinusoid 46 shown in the graph 45.

When detected by a binary detector, the signal 46 looks like a 1.25-GHz square wave having an alternating 1-0-1-0 pattern of bits transmitted at 2.5 Gb/s. This is ideal for maintaining the stable lock at the legacy receiver, but such a signal does not carry any information.

Figure 5:
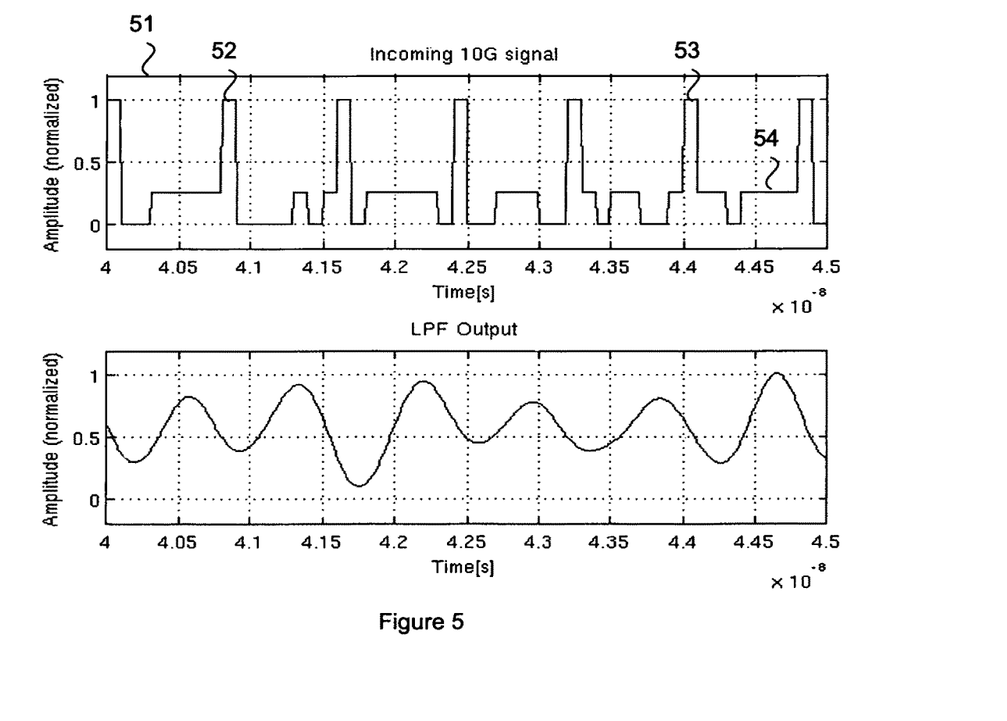
FIG. 5 shows a transmission signal having a 2.5 G spike signal with a 10 G data signal.

A variant of the signal 42 is shown as signal 52 in the graph 51 of FIG. 5. In the signal 52, the space 54 between pilot spikes 53 has been used to transmit 10-Gb/s data bits that are of the same duration as pilot spikes, but of much lower amplitude. Graph 55 of FIG. 5 shows the resulting signal 56 after passing the signal 52 through the low pass filter. The signal 56 is distorted, but still contains a detectable 1.25 Ghz component necessary to maintain the 2.5-Gb/s receiver locked.

Figure 6:
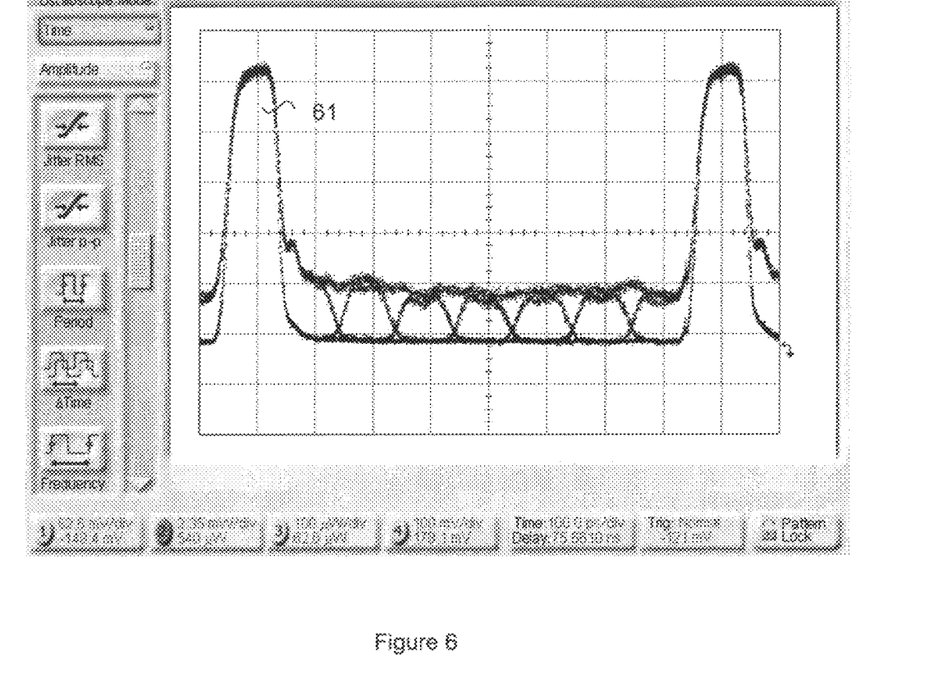
FIG. 6 shows a measured eye diagram corresponding to the transmission signal of FIG. 5.
Figure 7:
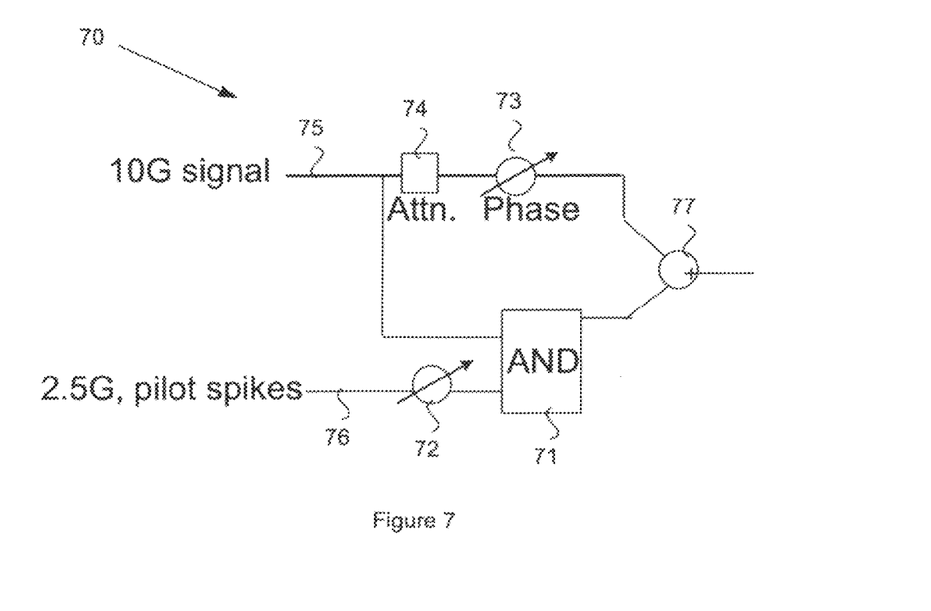
FIG. 7 schematically shows a circuit for generating the transmission signal of FIG. 5.

The signal 52 contains a pilot spike followed by 7 bits of data. The eye pattern of such a signal is shown in FIG. 6. A circuit 70 that can be used in the signal generator 19 of OLT 12 to generate the signal is shown in FIG. 7 and includes a 10 G data signal branch 75 which is provided to combiner (summer) 77. In the lower branch, an AND gate 71 has inputs from the 10 G data signal branch 75 and a 2.5 G clock signal branch 76, i.e. comprising the 2.5 G pilot spikes, with the output of the AND gate 71 being provided to combiner 77.

The output of AND gate 71 is forced to zero whenever the 2.5 G spike is not present and to the 10 G signal level whenever the spike is present. The upper branch 75 of the circuit is always at the 10 G signal level. An attenuator 74 in the branch allows tuning of the ratio between the 10 G eye height and the pilot spike height. Phase delays 72, 73 in the 2.5 G and 10 G branches respectively are used to tune the delays so that the pilot spike and the actual signal arrive to the combiner 77 aligned. The output of the combiner 77 provides the 10 G signal of the first partition 22 of the frame format 20 shown in FIG. 2 described above.

Figure 8:
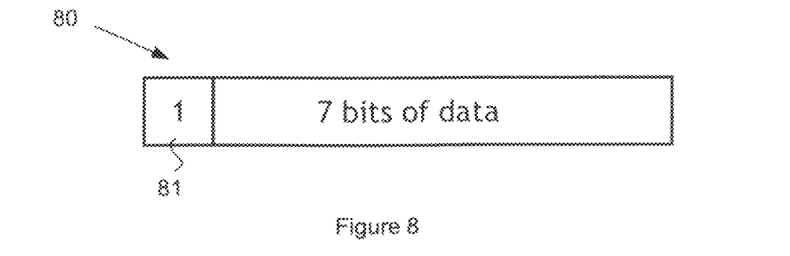
FIG. 8 schematically shows a line encoding of one embodiment of the disclosure.

If the 10 G signal is encoded using the 8-bit codeword 80 shown in FIG. 8, that is if the codeword whose one bit 81 is forced to 1 is the bit that coincides with the pilot spike, a signal that guarantees the spike every 8 bits is generated as shown in the eye pattern of FIG. 6. In this case, the AND gate 71 behaves as a pass-through element and is thus optional.

Figure 9:
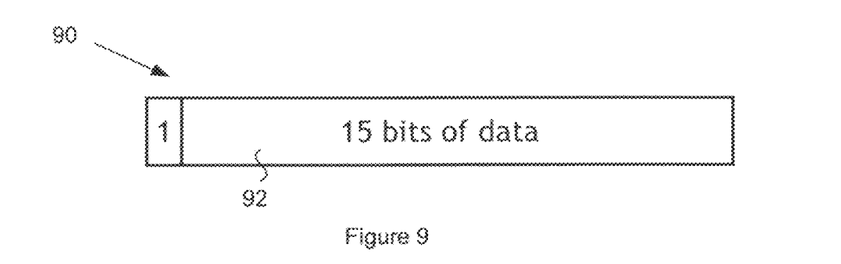
FIG. 9 schematically shows a line encoding of another embodiment of the disclosure.
Figure 10:
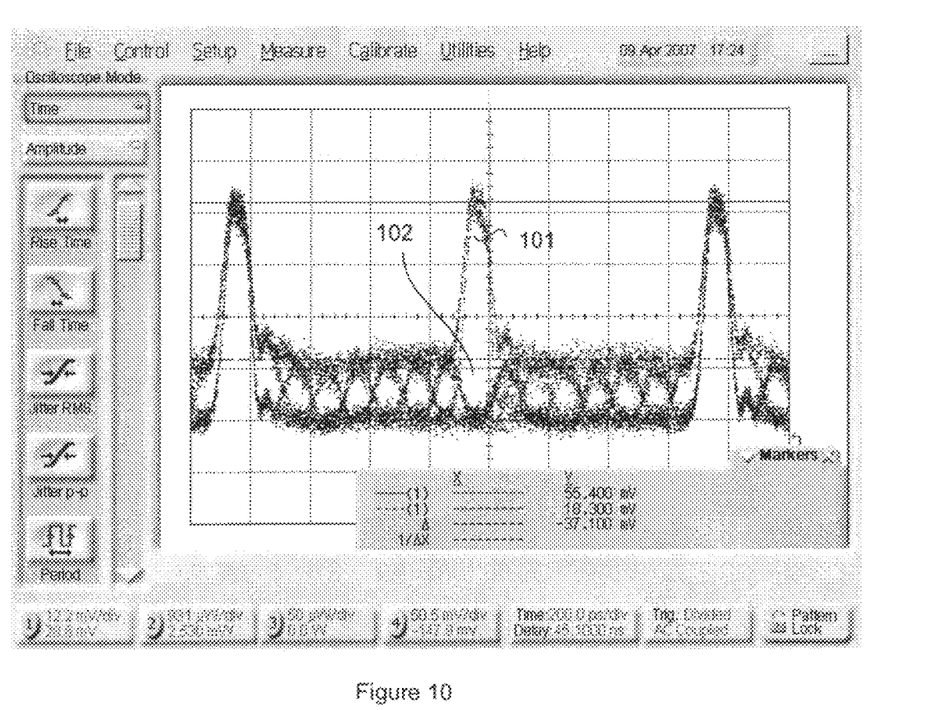
FIG. 10 schematically shows a measured eye diagram corresponding to the line encoding of FIG. 9.

However, the pilot spikes need not be present every 8 bits. Depending on the PLL type used at the legacy receiver, the system may be able to afford to occasionally lose a spike. In one embodiment, the location of the bit that corresponds to the pilot spike location need not be always forced to 1 and thus can be used for data. For example, if a line code 90 of FIG. 9 is used in which 15 data bits 92 are allowed, a pilot spike is guaranteed every 16 bits. However, the nominal spike between two guaranteed spikes will not always exist, i.e. if the transmitted data at the nominal spike location is 0. In FIG. 10, the eye pattern using the line encoding of FIG. 9 is shown. Comparing the eye pattern of FIG. 10 with the eye pattern of FIG. 6, it is observed that the spike 61 in FIG. 6 is always 1, while the spike in the middle of FIG. 10 is sometimes of nominal spike height 101 and sometimes 0 (102). If the 10 G data is scrambled (resulting in almost equal probability of having 1 or 0), approximately 50% of the 16-bit periods contain the spike at 8-bit grid, while the other 50% do not contain the middle spike. In this way the coding overhead can be reduced.

Other variations of the principles disclosed above are also possible. For example, the signal of FIG. 6 can be turned upside-down creating notches instead of spikes, which may be advantageous for some DC-coupled receivers. Further, spike positions can be varied by plus/minus a few 10 G. bits in any way that, after low-pass filtering, allows a dominating clock component to be recovered thereby allowing the 2.5 G PLL to maintain lock. Also, spikes may extend for multiple bit times. For example, it is possible to have a spike at nominal position as shown in FIG. 10 but with the adjacent bit also of the same height as the spike. All of these variants may be generated using the circuit of FIG. 7, as may be apparent to a person skilled in the art.

Experiments with a standard (2.5-Gb/s) GPON receiver have shown that a variety of power/bit-rate/error-rate/reliability trade-offs are possible. One specific class of experiments has shown that it is possible to lose every other spike with relatively small power penalty, which is the rationale for the line code of FIG. 9. In general the effect on the legacy GPON ONT is that the spike has to be stronger by a certain ratio for the legacy receiver to remain locked. The experiments for a spike width of 1 bit time, square shape and a guaranteed spike every 8 bits have shown that this ratio needs to be about 5× or 7 dB; that is, the ratio between the spike height and the 10 G eye height needs to be greater than 7 dB. For different spike widths, shapes and frequencies, the ratio may be different, but for each variant of modulation, a lower bound below which the receiver does not lock reliably exists. In one embodiment, the amplitude of the spike is typically greater than four times the amplitude of the 10 G data signal. If the spike is lower, the 10 G signal dominates and the 2.5 G receiver perceives it as noise to which it cannot lock. This represents a peak power penalty of 7 dB and average power penalty of roughly 4 dB compared to traditional 10-Gb/s NRZ signal that are not 2.5 G-friendly and thus not backwards compatible with legacy receivers.

Figure 11:
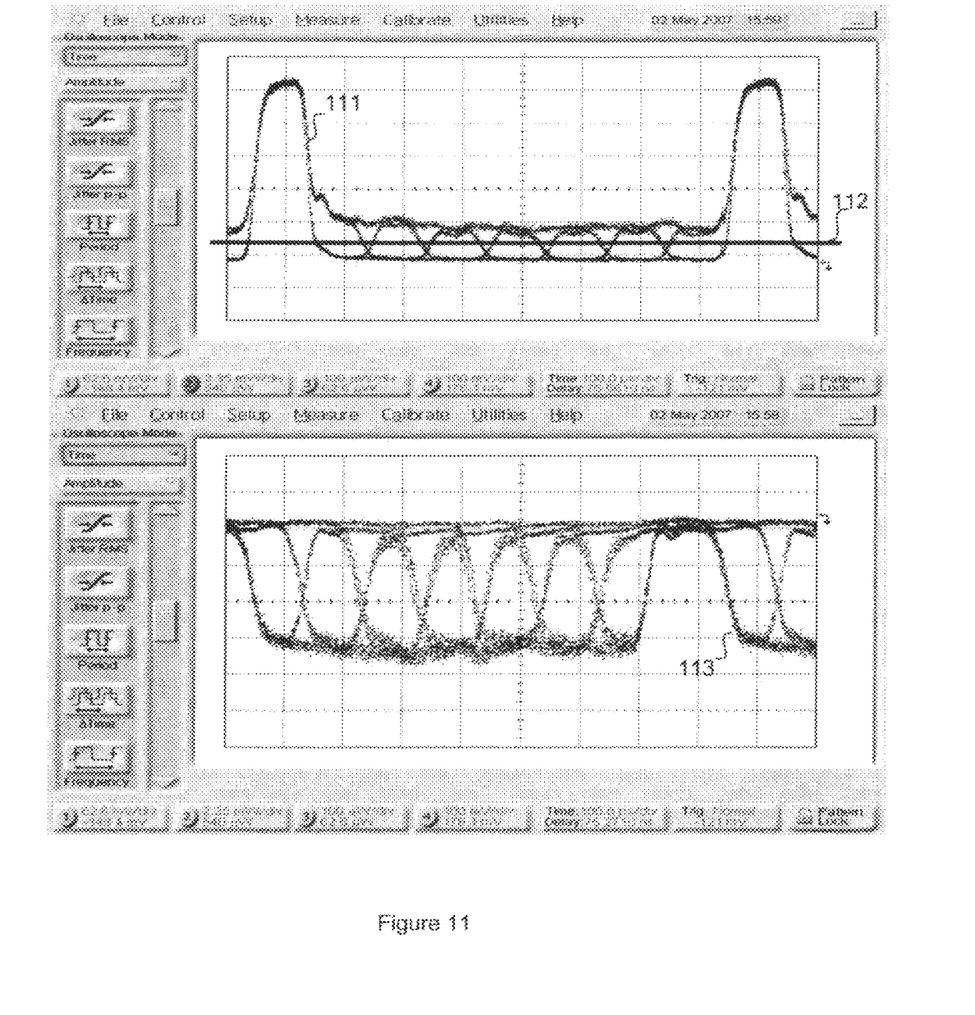
FIG. 11 schematically shows a transmission signal before and after applying threshold detection.

To detect the 10-Gb/s signal in the advanced ONTs 16, 17 of the network 10, a detection threshold must be established. Although the signal 111 shown, for example in FIG. 11, appears to be a multilevel signal, the actual information is contained in two levels only. A possible threshold 112 is indicated with the lower signal 113 showing the detected signal. Clearly, all bits are detectable and easily recovered.

Figure 12:
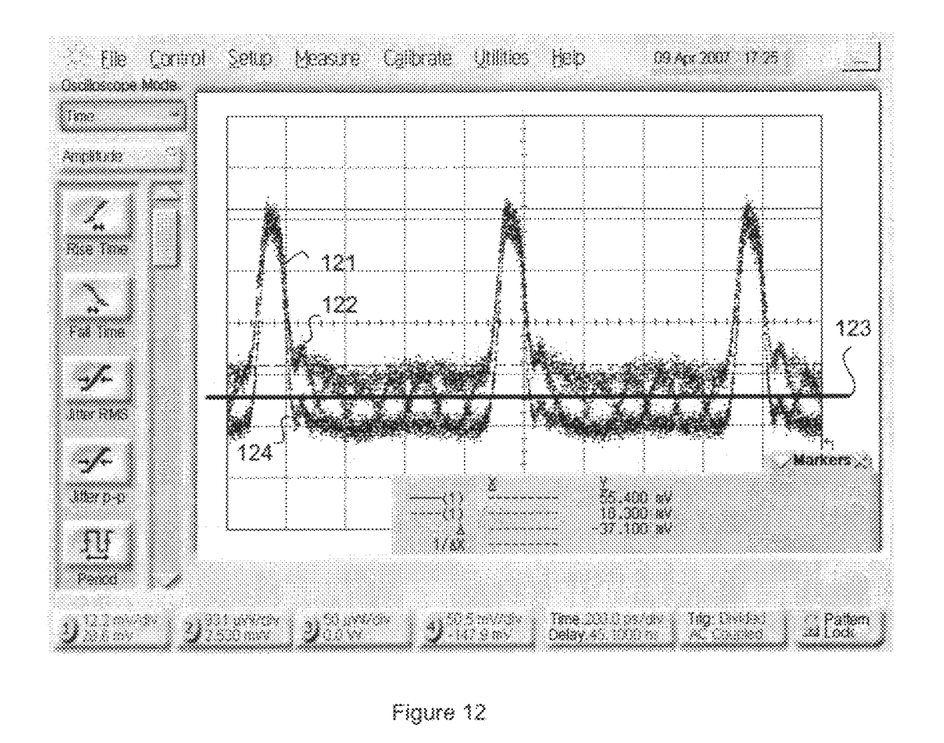
FIG. 12 schematically shows an eye diagram for an elevated data signal level incorporating a spike signal.
Figure 13:
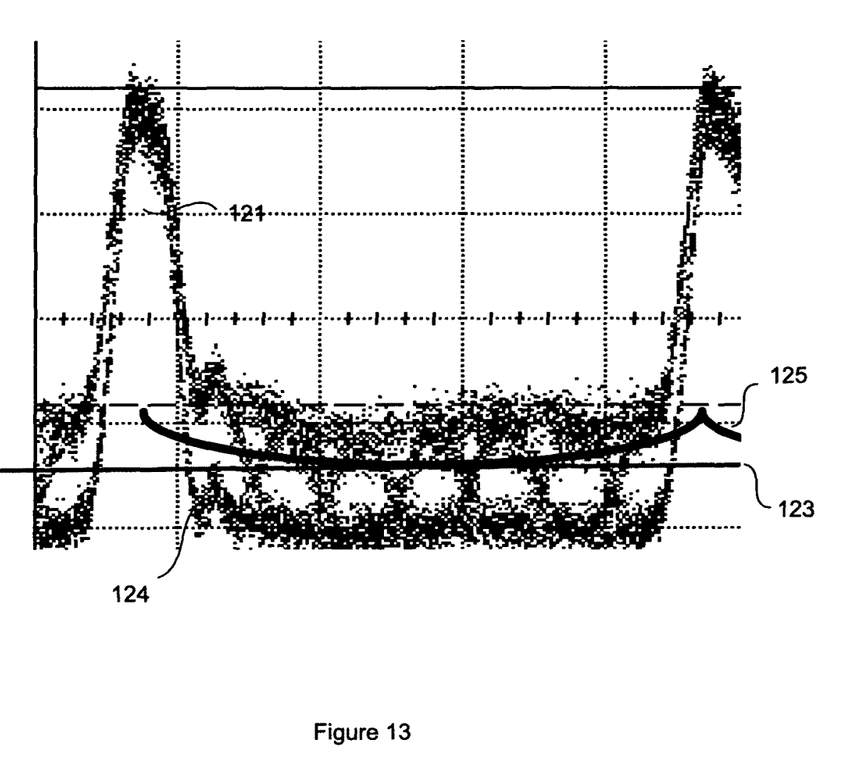
FIG. 13 shows an expanded view of the eye diagram of FIG. 12.
Figure 14:
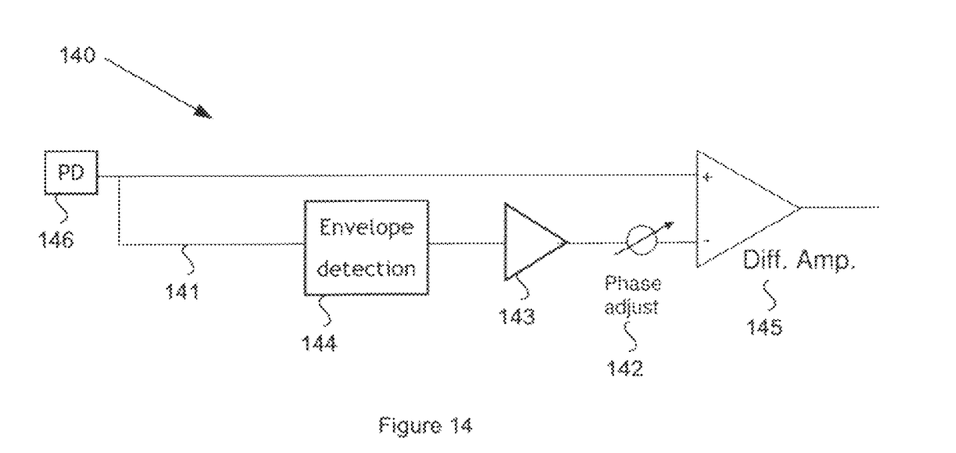
FIG. 14 schematically shows a circuit for detecting a data signal using a modulating threshold.

Accurate signal detection using a flat threshold typically requires expensive and high-quality components that create a clean signal, which is not necessarily practical as such components require wide bandwidth, wide dynamic range (i.e. linearity) and low noise. One of the effects seen when lower-quality components are used, shown in FIG. 12, is the elevation of the 10 G bit 122 that is adjacent to the pilot spike 121. The effect comes from the finite bandwidth of the components used. That is, in the vicinity of the pilot-spike, components are responding similarly as they would respond to the delta-pulse, and thus it takes a finite time to settle. The area of interest is shown in expanded view in FIG. 13. Importantly, a zero level bit 124 is observed to cross the flat threshold 123 and would therefore be erroneously detected as a 1 level bit. In one embodiment, a threshold 125 that tracks the elevations of the eye is used so that the problematic bits can be decoded more reliably. FIG. 14 shows a circuit 140 that can be used for detection of the 10 G signal. The lower branch 141 includes envelope detection 144 that is used to obtain a running partial average of the signal 146 and estimate the elevation of the eye. A phase shifter 142 and amplifier 143 in the branch 141 adjust the threshold position and level and the differential amplifier 145 is used to compare the received signal 146 against the threshold.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A passive optical network comprising:
   at least one optical line termination;
   at least one first optical network termination operating at a first speed; and
   at least one second optical network termination operating at a second speed slower than said first speed;
   wherein the at least one optical line termination transmits a data signal comprising at least one first speed partition and at least one second speed partition,
   wherein the at least one first speed partition comprises a signal processable by the at least one second optical network termination to extract a second speed clock signal.

2. The passive optical network according to claim 1 wherein the at least one first speed partition comprises a first speed data signal and a second speed clock signal.

3. The passive optical network according to claim 2 wherein an amplitude of said second speed clock signal is greater than an amplitude of said first speed data signal.

4. The passive optical network according to claim 3 wherein the amplitude of said second speed clock signal is greater than four times the amplitude of said first speed data signal.

5. The passive optical network according to claim 2 wherein the at least one first optical network termination comprises a detection circuit that determines a threshold and compares the first speed partition to said threshold to extract said first speed data signal.

6. The passive optical network of claim 5 wherein the detection circuit comprises an averaging circuit that determines said threshold using an at least partial average of said first speed partition.

7. The passive optical network of claim 1 wherein the at least one optical line termination comprises a signal generator comprising a combiner, a first input of said combiner comprising a first speed data signal and a second input of said combiner comprising said second speed clock signal.

8. The passive optical network of claim 7 wherein said signal generator further comprises an attenuator that controls the ratio of the first speed data signal and the second speed clock signal.

9. The passive optical network of claim 7 wherein said signal generator further comprises an AND gate, a first input of said AND gate comprising said first speed data signal and a second input of said AND gate comprising said second speed clock signal, wherein said second input of said combiner comprises an output of said AND gate.

10. A method of communicating data on a dual speed passive optical network comprising:

generating a transmission signal comprising at least one first partition and at least one second partition; and transmitting said transmission signal;

wherein the at least one first partition comprises a first data signal at a first speed and a clock signal at a second speed;

wherein the at least one second partition comprises a second data signal at said second speed, wherein said second speed operates at a slower speed than said first speed;

generating a periodic spike signal having an amplitude greater than an amplitude of said first data signal, a periodicity of said spike signal corresponding to said second speed.

11. The method according to claim 10 wherein said spike signal comprises a plurality of pulses placed at a 1.25 Ghz grid.

12. The method according to claim 11 wherein said pulses have a width of one first speed bit.

13. The method according to claim 10 comprising processing said transmission signal in a first optical network termination to extract said first data signal from said first partition.

14. The method according to claim 13 wherein processing said transmission signal comprises applying a modulating threshold to said first partition to extract said first data signal.

15. The method according to claim 13 comprising processing said transmission signal in a second optical network termination to extract said second data signal from said at least one second partition and said clock signal from said at least one first partition.

16. An optical line termination comprising:

a signal generator that generates a signal comprising a first data signal at a first speed and a timing signal at a second speed; and a transmitter configured to transmit at least one of the first data signal and the timing signal;

wherein said second speed operates at a slower speed than said first speed;

wherein a periodic spike signal is generated having an amplitude greater than an amplitude of said first data signal, a periodicity of said spike signal corresponding to said second speed.

17. The optical line termination according to claim 16 wherein the first data signal and the timing signal are generated in a first partition, wherein the signal comprises at least one second partition comprising a second data signal at said second speed.

18. The optical line termination according to claim 17 wherein the first data signal is a 10-Gb/s data signal and the timing signal is a 2.5-Gb/s timing signal.

* * * * *